United States Patent [19]

Floyd et al.

[11] Patent Number: 5,396,692

[45] Date of Patent: Mar. 14, 1995

[54] NON-LINEAR TORSIONAL ASSIST MECHANISM AND METHOD

[75] Inventors: Kirby H. Floyd, San Jose; John J. Busuttil, Santa Clara, both of Calif.

[73] Assignee: FMC Corporation, Chicago, Ill.

[21] Appl. No.: 783,643

[22] Filed: Oct. 28, 1991

[51] Int. Cl.⁶ .............................................. B23P 19/04
[52] U.S. Cl. .................................... 29/436; 29/230; 292/256.5
[58] Field of Search ................... 29/173, 225, 230, 240, 29/240.5, 281.6, 434, 436, 804, 898.07; 49/324, 386; 292/256.5; 16/72, 80, 81

[56] References Cited

U.S. PATENT DOCUMENTS

| | | | |
|---|---|---|---|
| 3,888,528 | 6/1975 | Jericijo | 292/256.5 |
| 4,094,542 | 6/1978 | Siblik | 292/256.5 |
| 4,591,136 | 5/1986 | Leonard | 49/386 X |
| 4,828,236 | 5/1989 | Inoue | 49/386 X |

FOREIGN PATENT DOCUMENTS

| | | | |
|---|---|---|---|
| 3812881 | 11/1989 | Germany | 49/386 |
| 3902879 | 8/1990 | Germany | 49/386 |
| 88871 | 3/1990 | Japan | 49/386 |

*Primary Examiner*—Peter Dungba Vo
*Attorney, Agent, or Firm*—Michael Lee; R. C. Kamp

[57] ABSTRACT

The invention provides an indirect linkage between a spring and a hatch supported by the spring. The torque or moment applied by the hatch is significantly curved. The indirect linkage which provides a first varying moment arm and a second varying moment arm and utilizes a varying ratio between the first moment arm and the second moment arm to provide an applied spring torque which matches the shape of the torque curve applied by the hatch.

19 Claims, 6 Drawing Sheets

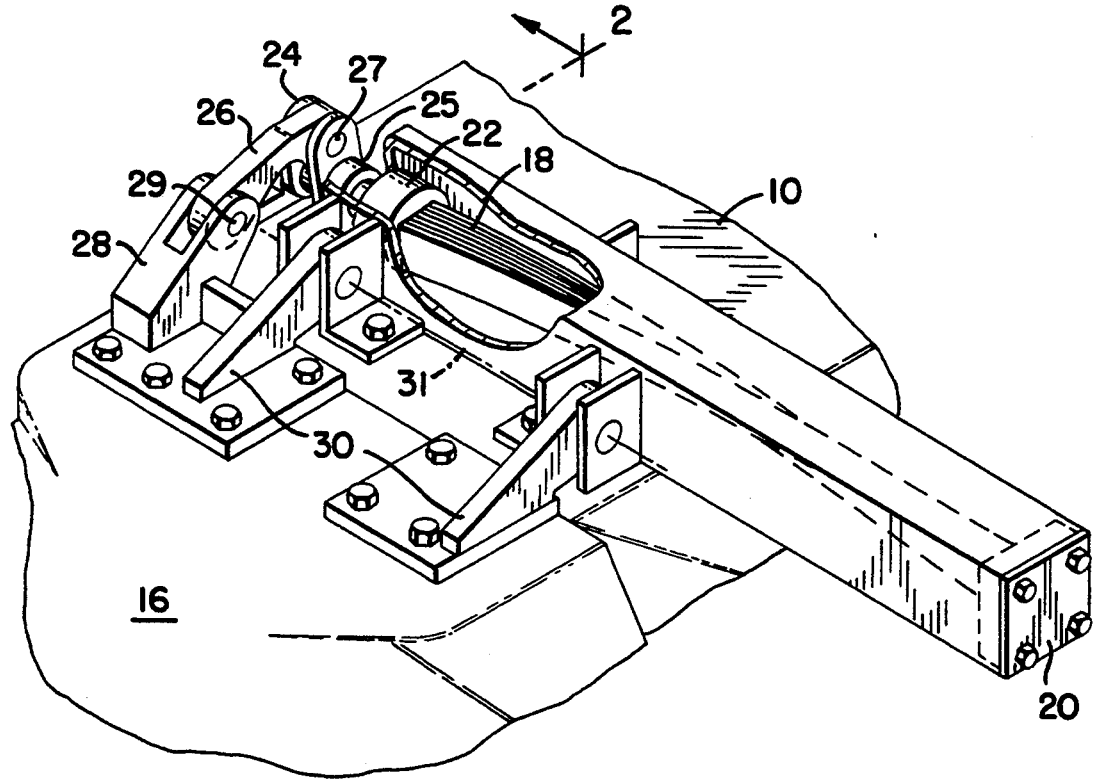
FIG_1
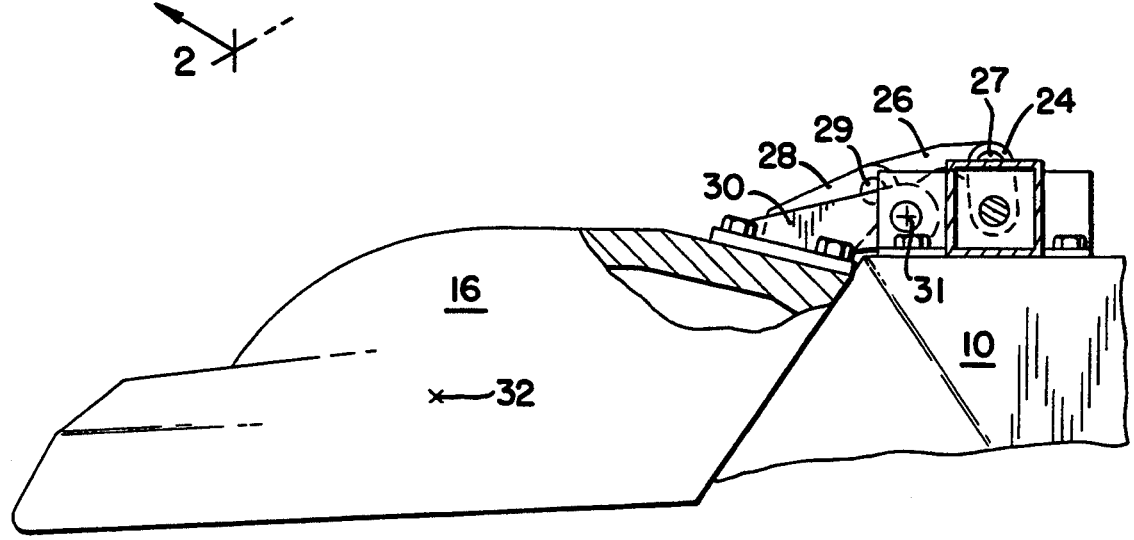
FIG_2

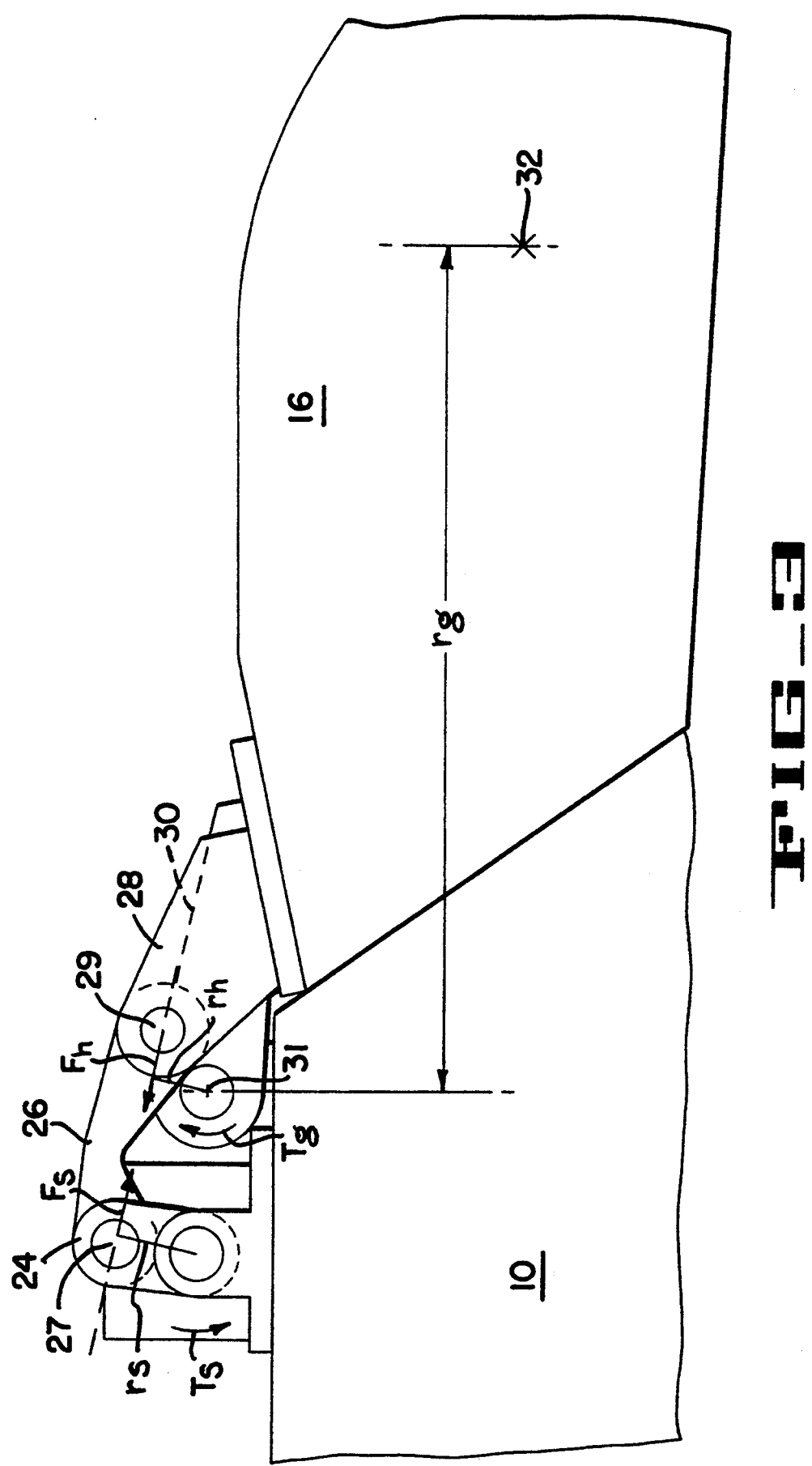

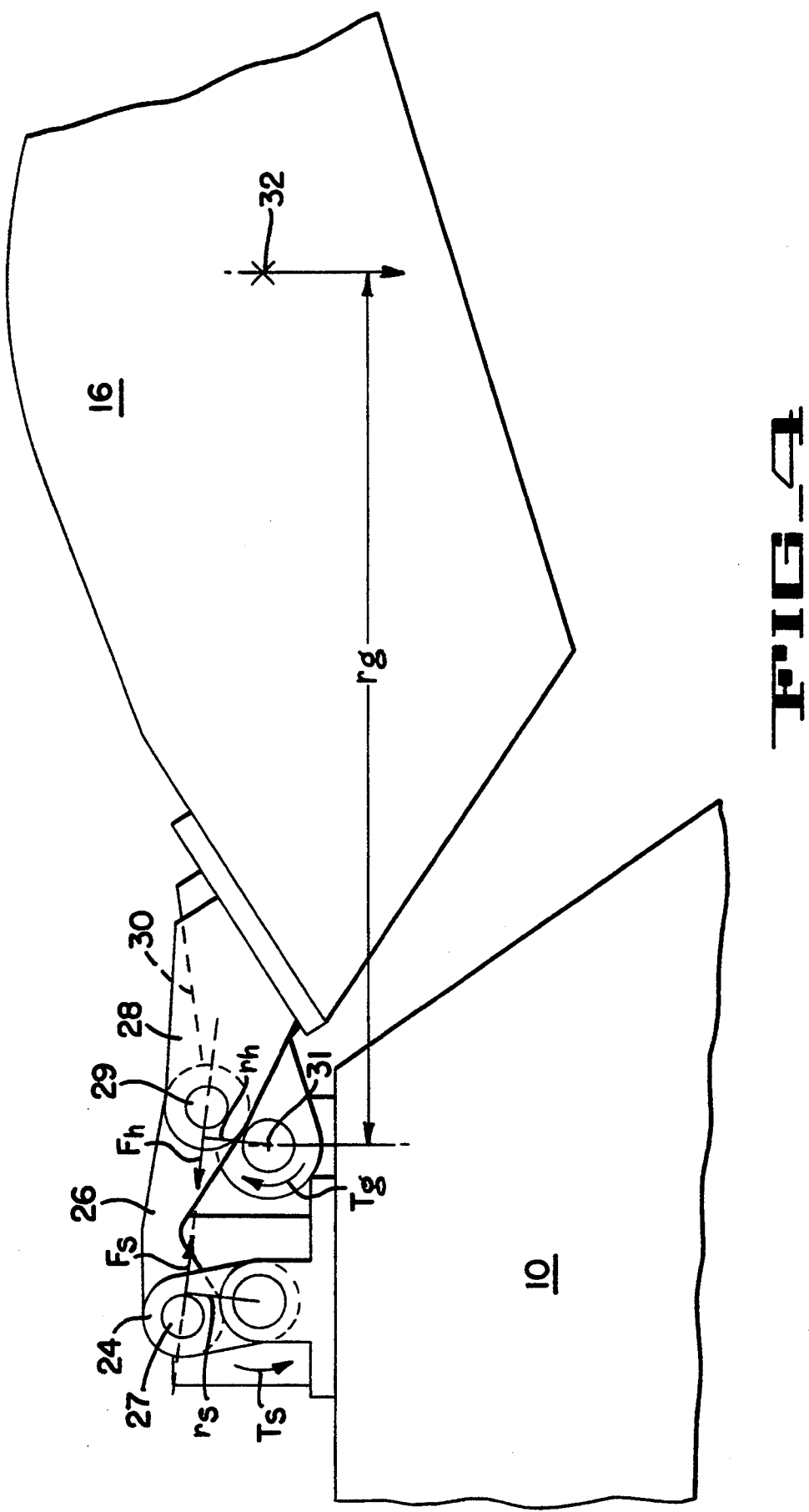

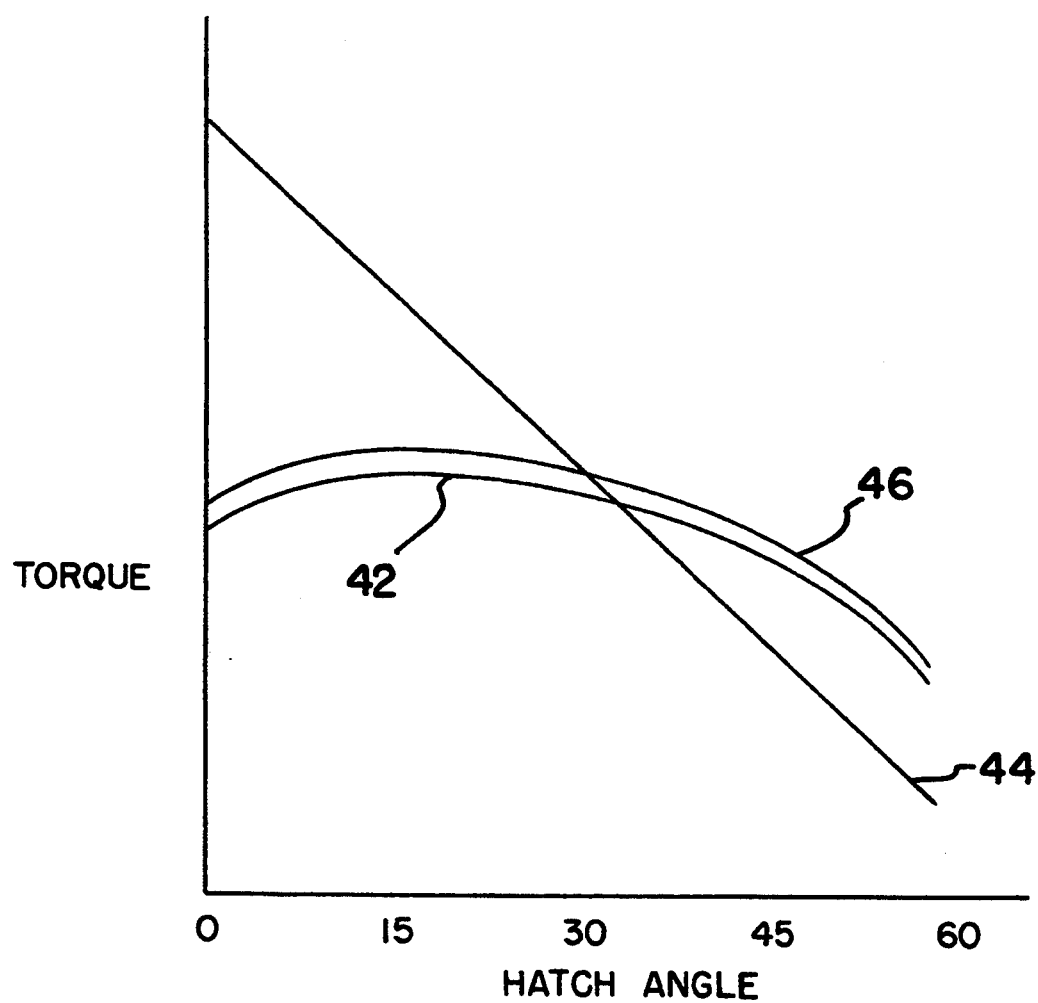
FIG_6

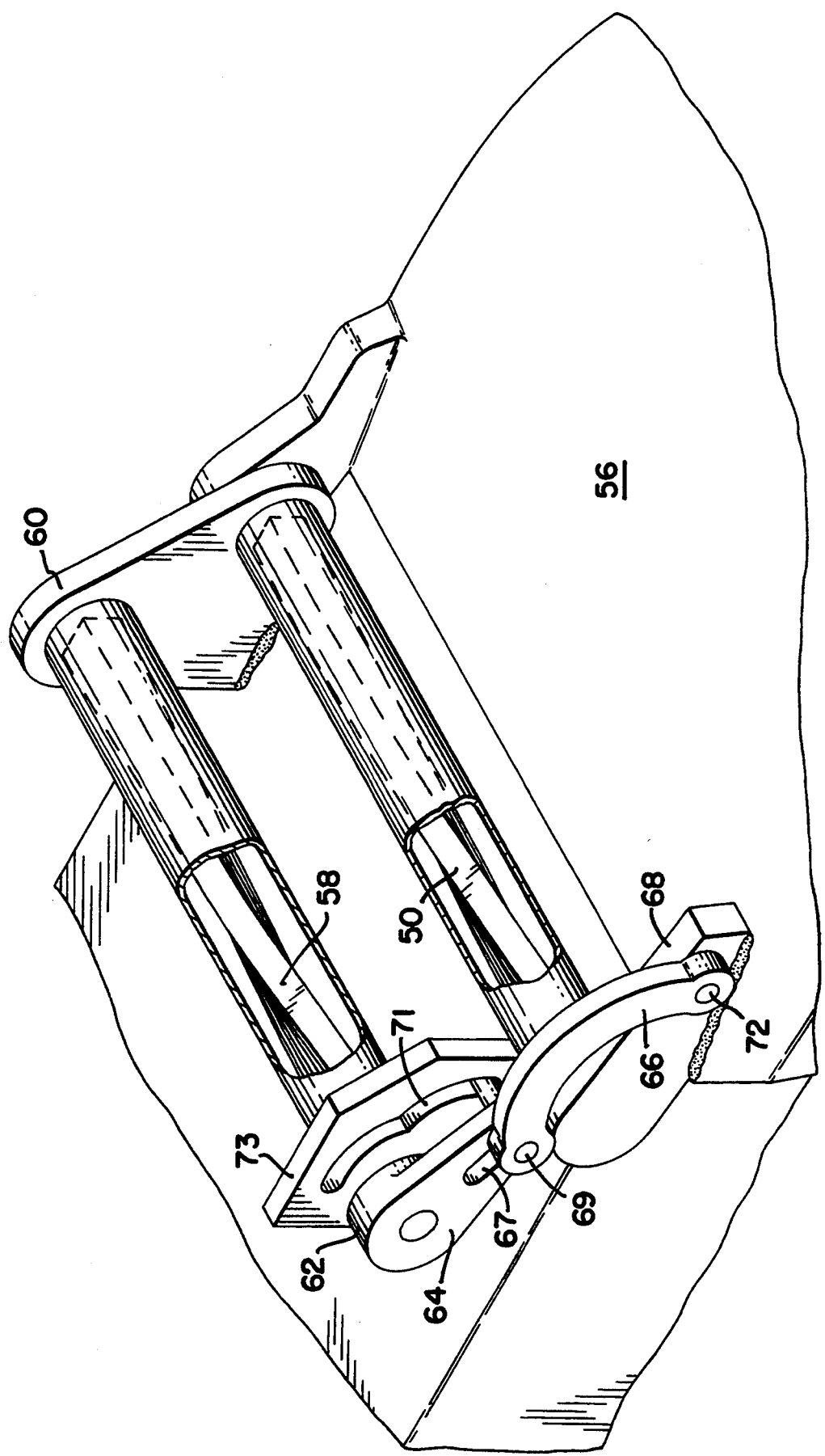

NON-LINEAR TORSIONAL ASSIST MECHANISM AND METHOD

SUMMARY OF THE INVENTION

In the prior art, torsion springs are used to assist in the opening and closing of hatches. Most torsion springs in the prior art provided a substantially linear torque curve. Since the gravitational moment on some hatches is curved, in the opening or closing a hatch the force needed to provide such movement would vary according to the position of the hatch. A hatch could be a hatch on a tank, a door for a car or car trunk, or other such movable means.

It is an object of the invention to provide an apparatus which provides a significantly curved torque curve.

It is another object of the invention to provide a hatch assist mechanism which provides a torque curve similar to the gravitational moment of the hatch.

BRIEF DESCRIPTION OF THE DRAWINGS

FIG. 1 is a perspective view of a tank hatch utilizing a preferred embodiment of the invention.

FIG. 2 is a side view of the embodiment illustrated in FIG. 1 along lines 2—2.

FIG. 3 is a side view of part of the embodiment illustrated in FIGS. 1 and 2, view from the direction opposite from the view in FIG. 2.

FIG. 4 is a side view of the embodiment illustrated in FIG. 1, with the same view as the view in FIG. 3, but with the hatch partially open.

FIG. 6 illustrates a graph of the hatch angle versus the torque of gravity acting on the hatch, the torsion spring, and the torque applied to the hatch by the torsion spring.

FIG. 7 is a perspective view of another embodiment of the invention, which utilizes a second torsion spring and a cam and follower.

DETAILED DESCRIPTION

Figure 5:
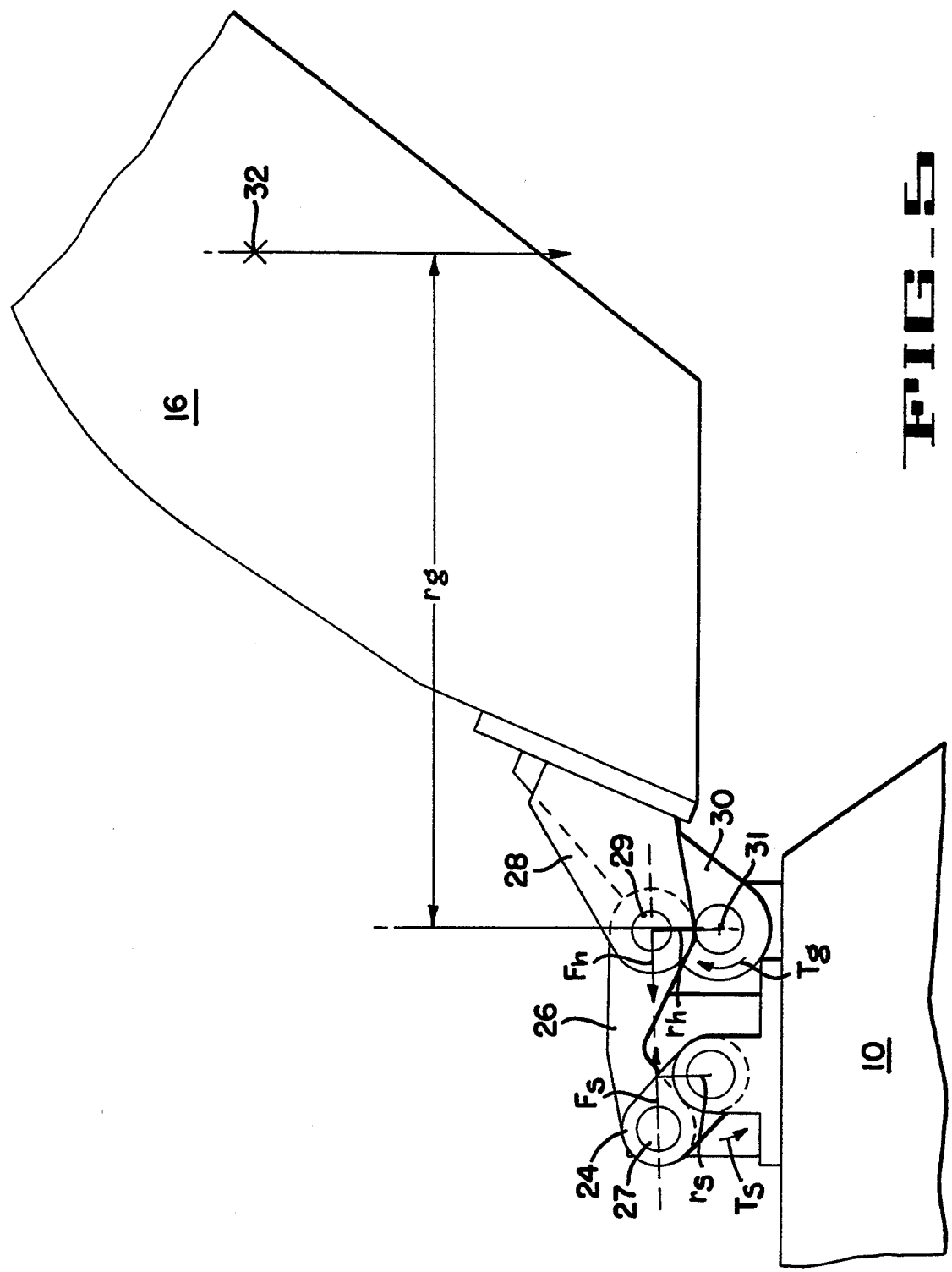
FIG. 5 is a side view of the embodiment illustrated in FIG. 1, with the same view as the view in FIG. 3, but with the hatch fully open.

FIG. 1 is a perspective view of a tank hatch 16 utilizing a preferred embodiment of the invention. The tank hatch 16 is attached to a military vehicle 10 with the hatch 16 being in a closed position. The spring mechanism used in this embodiment of the invention is a torsion spring 18, comprising 14 flat metal plates with each plate being a spring. The plates or springs are stacked to form the torsion spring 18. A first end of the torsion spring 18 is held in a fixed position by a fixed anchor 20. A second end of the torsion spring 18, opposite from the first end, is attached to a rotating anchor 22 which is mechanically connected to a first end of a spring arm 24. A bearing 25 is used to support the rotating anchor 22 and allow the rotating anchor 22 and the spring arm 24 to rotate. A second end of the spring arm 24, which is opposite to the first end of the spring arm 24, is mechanically connected to a first end of a connecting arm 26 by a pin 27, so that the connecting arm 26 may rotate with respect to the spring arm 24. A second end of the connecting arm 26, which is opposite the first end of the connecting arm 26, is connected to a first end of a hatch arm 28 by a pin 29 so that the connecting arm 26 may rotate with respect to the hatch arm 28. A second end of the hatch arm 28 is mechanically connected to the tank hatch 16. The hatch arm 28 and the hatch 16 are connected in such a manner so that as the hatch 16 moves the hatch arm 28 moves. A hinge means 30 allows the hatch 16 to rotate around a desired axis of rotation 31 of the hatch 16.

FIG. 2 is side view of a complete hatch 16 and a preferred embodiment of the inventive spring system taken generally along lines 2—2 of FIG. 1. An "x" is used to designate an axis along which the center of gravity 32 of the hatch 16 lies. A vector originating at the center of gravity 32 is used to illustrate the gravitational force on the hatch 16. In this embodiment, since the center of gravity 32 of the hatch 16 is vertically lower than the axis of rotation 31 of the hatch 16, as the hatch is opened the gravitational torque moment of gravity on the hatch 16 will first increase until the center of gravity 32 of the hatch 16 is at the same vertical height as the axis of rotation 31 of the hatch 16 and then will decrease as the center of gravity 32 of the hatch 16 becomes vertically higher than the axis of rotation 31 of the hatch 16.

FIG. 3 illustrates a side view of the embodiment of the invention illustrated in FIGS. 1 and 2 showing part of the hatch 16 in a closed position and viewed from the direction opposite from the direction of view in FIG. 2. FIG. 3 illustrates static forces applied by the invention and moment arms for such forces. Gravity applies a vertical force on the hatch 16, wherein the summation of the gravitational force on the hatch equals a single force vector at the center of gravity 32 of the hatch 16 as illustrated. The gravitational moment arm is the horizontal distance from the center of gravity 32 of the hatch 16 to the axis of rotation 31 of the hatch 16, as designated by line $r_g$. The hatch 16 provides a first torque around the axis of rotation 31 of the hatch 16. The first torque is countered by a force from the connecting arm 26 on the first end of the hatch arm 28. The torsion springs 18 provide a spring torque $T_s$ on the first end of the spring arm 24. The rotational force from the torsion springs 18 is countered by a force from the connecting arm 26 on the second end of the spring arm 24. The force $F_h$ applied by the connecting arm 26 to the hatch arm 28 is equal to and opposite to the force $F_s$ applied by the connecting arm 26 to the spring arm 24. Since $F_s$ and $F_h$ are equal and opposite, they are parallel to a line from the connecting point between the hatch arm 28 and the connecting arm 26 and the connecting point between the spring arm 24 and the connecting arm 26. The moment arm of $F_s$ is $r_s$, and the moment arm of $F_h$ is $r_h$ as shown. Since in a static model $F_s = -F_h$, the torque applied by the invention around the axis of rotation 31 of the hatch 16 is $T_{rs} = F_h(r_h) = -F_s(r_h) = -(T_s/r_s)r_h = -T_s(r_h/r_s)$. Gravity provides a torque $T_g$ around the axis of rotation 31 of the hatch 16 in an opposite direction equal to $T_g = (M)(g)(r_g)$, wherein M is the mass of the hatch 16, g is the gravitational constant, and $r_g$ is the moment arm between the center of gravity 32 of the hatch 16 and the axis of rotation 31 of the hatch 16.

FIG. 4 illustrates another side view of the embodiment of the invention showing part of the hatch 16 in a partially opened position and viewed from the same direction as FIG. 3. FIG. 4 illustrates static forces applied by the invention and moment arms for such forces. In this position, the moment arm of gravity $r_g$ on the hatch is greater than the moment arm of gravity $r_g$ on the hatch when the hatch is closed as shown in FIG. 3. Therefore the gravitational moment $T_g$ of the hatch 16 in a slightly opened position as shown in FIG. 4 is greater than the gravitational moment $T_g$ of the hatch 16 in a closed position as shown in FIG. 3. In the slightly opened position as shown in FIG. 4 the ratio $(r_h/r_s)$ is greater than the ratio $(r_h/r_s)$ of a closed hatch as shown in FIG. 3. Although the torque from the spring $T_s$ of a slightly opened hatch 16 as shown in FIG. 4 is less than torque from the spring $T_s$ of a closed hatch 16 as shown in FIG. 3 because the torque from the spring $T_s$ is linearly decreasing, the change in the ratio $(r_h/r_s)$ offsets the decrease causing the torque from the spring applied around the axis of rotation $T_{rs} = -T_s(r_h/r_s)$ of the slightly open hatch 16 as shown in FIG. 4 to be greater than the torque from the spring applied around the axis of rotation $T_{rs}$ of the closed hatch 16 as shown in FIG. 3. This increase in the spring torque applied to the axis of rotation $T_{rs}$ accommodates the increase in the gravitational torque $T_g$ of the hatch 16 in a slightly opened position.

FIG. 5 illustrates another side view of the embodiment of the invention showing part of the hatch 16 in a fully opened position and viewed from the same direction as FIG. 3. FIG. 5 illustrates static forces applied by the invention and moment arms for such forces. In this position, the moment arm of gravity $r_g$ on the hatch 16 is less than the moment arm of gravity $r_g$ on the hatch 16 when the hatch is partially open as shown in FIG. 4. Therefore the gravitational moment $T_g$ of the hatch 16 in a fully opened position as shown in FIG. 5 is less than the gravitational moment $T_g$ of the hatch 16 in a slightly open position as shown in FIG. 4. In the fully opened position as shown in FIG. 5 the ratio $(r_h/r_s)$ is greater than the ratio $(r_h/r_s)$ of a partially open hatch as shown in FIG. 4. The torque from the spring $T_s$ of a fully open hatch 16 as shown in FIG. 5 is greater than torque from the spring $T_s$ of a partially open hatch 16 as shown in FIG. 4, because the torque from the spring $T_s$ is linearly decreasing. The torque from the spring 18 applied around the axis of rotation $T_{rs} = -T_s(r_h/r_s)$ of the fully open hatch 16 as shown in FIG. 5 is less than the torque from the spring 18 applied around the axis of rotation $T_{rs}$ of the partially open hatch 16 as shown in FIG. 4. This decrease in the spring torque applied to the axis of rotation $T_{rs}$ accommodates the decrease in the gravitational torque $T_g$ of the hatch 16 in a fully opened position.

The pins 27 and 29 may use needle roller bearings to reduce friction. Pins at the axis of rotation 31 may use filament wound bearing to reduce friction.

In a specific example of the previously described embodiment of the invention. A torsion spring 18 is attached to a spring arm 24, which is initially in an approximately vertical position, and which has a distance of 2.10 inches from the point of rotation of the torsion spring to the center of the pin 27 connection between the spring arm 24 and the connecting arm 26. The connecting arm 26 has a distance of 5.5 inches from the center of the pin 27 connection between the spring arm 24 and the connecting arm 26 to the center of the pin 29 connection between the connecting arm 26 and the hatch arm 28. The hatch arm has a distance of 2.00 inches from the center of the pin 29 connection between the connecting arm 26 and the hatch arm 28 and the axis of rotation 31 of the hatch 16. Initially, when the hatch is closed, a line between the center of the pin 29 connection between the connecting arm 26 and the hatch arm 28 and the axis of rotation 31 of the hatch 16 is approximately 40° above the horizontal. The axis of rotation 31 of the hatch is approximately horizontal to the point of rotation of the spring and separated from the point of rotation of the spring by approximately 4 inches. The center of gravity 32 of the hatch 16 is approximately 15° below the horizontal from the axis of rotation 31 of the hatch 16 which has a weight of 425 pounds. Below is a table giving the values of the angle that hatch 16 is opened from the closed position, the moment arm $r_s$ of the spring force $F_s$, the moment arm $r_h$ of the hatch force $F_h$, the ratio of $r_h/r_s$, the spring torque $T_s$, the torque applied around the axis of rotation 31 of the hatch 16 by the spring 18 $T_{rs} = -T_s(r_h/r_s)$, the moment arm $r_g$ between the center of gravity 32 of the hatch 16 and the axis of rotation 31, the gravitational moment $T_g$, and the net torque applied to the axis of rotation 31 which is the sum of the string torque $T_{rs}$ and the gravitational moment $T_g$.

| Angle | $r_s$ | $r_h$ | $r_h/r_s$ | $T_s$ | $T_{rs}$ | $r_g$ | $T_g$ | $T_{rs}+T_g$ |
|---|---|---|---|---|---|---|---|---|
| 0° | 2.09 | 1.5 | .719 | 9880 | −7103 | 16.32 | 6936 | −167 |
| 15° | 2.04 | 1.73 | .850 | 8660 | −7361 | 17.0 | 7227 | −134 |
| 30° | 1.91 | 1.89 | .987 | 7239 | −7145 | 16.5 | 7026 | −119 |
| 45° | 1.71 | 1.97 | 1.155 | 5564 | −6454 | 14.93 | 6347 | −107 |
| 54° | 1.52 | 2.00 | 1.316 | 4445 | −5850 | 13.48 | 5727 | −123 |

FIG. 6 illustrates a gravitational moment curve 42 on a hatch for a tank with the angle of the hatch 16 along the abscissa and the gravitational torque along the ordinate, using the values from the example above. A linear spring torque curve 44 is also illustrated with the angle of the hatch along the abscissa and the torque applied by the torsion springs along the ordinate. The hatch at a closed position is at 0°. At the closed position the torque from the torsion springs is much greater than the torque from gravity on the hatch. In addition a torque curve 46 of the torque applied around the axis of rotation by the above described embodiment of the invention is also illustrated.

In the prior art systems that connect the linear torque curve springs directly to the hatch and using the values in the above example, in the closed position the torque 44 from the torsion springs is much greater than the torque 42 from gravity on the hatch. This may cause the torsion spring to slightly open the hatch, and requires the operator of the hatch to pull the hatch shut. If the torsion springs in the above example were attached directly to the hatch as done in the prior art, the operator would apply a torque of 2944 inch pounds pulling on the hatch. As the hatch is opened, the gravitational torque is maximized when the angle of the hatch is approximately 15° from the closed position. When the hatch is approximately 45° from the closed position the torsional spring torque is less than the gravitational moment on the hatch. The operator of the hatch must push on the hatch with a torque equal to the difference between the height of the gravitational moment curve 42 and the height of the linear torque curve 44 at the 45° angle, which in the above example means the operator would apply a torque of 783 inch pounds.

In the above example of the above embodiment of the invention allows the operator to open or close the hatch without applying a torque greater than 167 inch pounds.

FIG. 7 illustrates another embodiment of the invention. In this embodiment, a first linear torque curve torsion spring 50 is directly connected to a hatch 56. A second linear torque curve torsion spring 58 is anchored on a first side by a fixed anchor 60. A second end of the second torsion spring 58 is connected to a rotating anchor 62, which is connected to a first end of a spring arm 64. A second end of the spring arm 64 is connected to a first end of a connecting arm 66 by a first pin 69, which is able slide in a slot 67 along the length of the spring arm 64. The first pin 69 rotatably connecting the spring arm with the connecting arm extends through the slot 67 in the spring arm 64 to a slot 71 in the housing 73, causing the first pin 69 and slot 71 in the housing 73 to act as a cam and follower. A second end of the connecting arm 66 is connected to an end of a hatch arm 68 by a second pin 72. The hatch arm 68 is connected to the hatch 56 and the first torsion spring 50. The two torsion springs 50 and 58 provide more spring torque. The cam and follower provide a more regulated variable spring moment arm length.

The embodiments of the invention provide an indirect linkage between a spring and a hatch supported by the spring. The torque or moment applied by the hatch is significantly curved. The indirect linkage which provides a first varying moment arm and a second varying moment arm and utilizes a varying ratio between the first moment arm and the second moment arm to provide an applied spring torque which matches the shape of the torque curve applied by the hatch.

While preferred embodiments of the present invention have been shown and described herein, it will be appreciated that various changes and modifications may be made therein without departing from the spirit of the invention as defined by the scope of the appended claims.

What is claimed is:

1. An apparatus for supporting a hatch, comprising:
   a housing;
   a spring with a first end and a second end in the housing;
   a fixed anchor attached between the first end of the spring and the housing;
   a movable anchor attached to the second end of the spring;
   a spring arm with a first end and a second end, wherein the first end of the spring arm is attached to the movable anchor;
   means for allowing the spring arm to rotate around an axis of rotation of the spring arm;
   a connecting arm with a first end and a second end;
   means for connecting the first end of the connecting arm to the second end of the spring arm in a manner which allows the connecting arm to rotate around the second end of the spring arm;
   a hatch arm, wherein the hatch arm is connected to the hatch; and
   means for connecting the hatch arm to the second end of the connecting arm in a manner which allows the hatch arm to rotate with respect to the connecting arm.

2. An apparatus, as claimed in claim 1, wherein the spring is a torsion spring.

3. An apparatus, as claimed in claim 1, the movable anchor rotates and wherein the second end of the spring arm rotates around the movable anchor.

4. An apparatus, as claimed in claim 1, wherein the means for connecting the first end of the connecting arm to the second end of the spring arm, comprises a pin with a round diameter inserted in a hole in the spring arm and in a hole in the connecting arm.

5. An apparatus, as claimed in claim 4, wherein the means for connecting the second end of the connecting arm to the hatch arm, comprises a pin with a round diameter inserted in a hole in the connecting arm and in a hole in the hatch arm.

6. An apparatus, as claimed in claim 4, further comprising a second torsion spring directly attached to the hatch.

7. An apparatus as claimed in claim 1, further comprising means for allowing the hatch to rotate around an axis of rotation for the hatch, wherein a line from the axis of rotation for the hatch to the means for connecting the hatch arm to the second end of the connecting arm is not parallel to a line from the axis of rotation of the spring arm to the means for connecting the first end of the connecting arm to the second end of the spring arm.

8. An apparatus for supporting a hatch, comprising:
   a housing;
   a spring with a first end and a second end in the housing;
   a fixed anchor attached between the first end of the spring and the housing;
   a movable anchor attached to the second end of the spring:
   a spring arm with a first end and a second end, wherein the first end of the spring arm is attached to the movable anchor;
   means for allowing the spring arm to rotate around an axis of rotation of the spring arm;
   a connecting arm with a first end and a second end;
   means for connecting the first end of the connecting arm to the second end of the spring arm in a manner which allows the connecting arm to rotate around the second end of the spring arm;
   a hatch arm, wherein the hatch arm is connected to the hatch;
   a cam attached to the housing, wherein the second end of the spring arm has a slot through which the means for connecting the first end of the connecting arm to the second end of the spring arm passes, and wherein the connecting means is a follower on the cam; and
   means for connecting the hatch arm to the second end of the connecting arm in a manner which allows the hatch arm to rotate with respect to the connecting arm.

9. A method for supporting a hatch, comprising the steps of:
   anchoring a first end of a spring to a fixed housing;
   anchoring a second end of the spring to a movable anchor;
   attaching a first end of a spring arm to the movable anchor;
   attaching a second end of the spring arm to a connecting arm so that the spring arm may rotate with respect to the connecting arm;
   connecting a second end of the connecting arm to a hatch arm so that the spring arm may rotate with respect to the connecting arm; and
   connecting the hatch arm to the hatch.

10. A method, as claimed in claim 9, wherein the movable anchor rotates and wherein the spring arm rotates around a spring arm axis of rotation which passes through the movable anchor.

11. A method, as claimed in claim 9, wherein the attaching the second end of the spring arm to the first end of the connecting arm, comprises the step of inserting a pin with a round diameter into a hole in the spring arm and in a hole in the connecting arm.

12. A method, as claimed in claim 11, wherein the attaching the second end of the connecting arm to the hatch arm, comprises the step of inserting a pin with a round diameter into a hole in the connecting arm and in a hole in the hatch arm.

13. A method for assisting the movement of a hatch, comprising the steps of:
    applying a force from a spring to a spring arm, causing the spring arm to rotate around a spring arm axis of rotation;
    applying a force from the rotating spring arm to a connecting arm, causing the connecting arm to rotate with respect to the spring arm and to translate;
    changing the moment arm of the force applied from the spring arm to the connecting arm as the spring arm is rotated;
    applying a force from the rotating and translating connecting arm to a hatch arm to cause the hatch arm to rotate;
    changing the ratio of the moment arm of the force applied from the spring arm to the connecting arm to the moment arm of the force applied by the connecting arm to the hatch arm, as the spring arm is rotated; and
    applying a force from the hatch arm to the hatch.

14. A method, as claimed in claim 13, wherein the step of applying a force from a spring, comprises the steps of:
    applying a force from a twisted torsion spring, to rotate a rotating anchor; and
    applying a force from the rotating anchor to the spring arm.

15. A method, as claimed in claim 14, wherein the step of applying a force from the connecting arm to the hatch arm, comprises the step of connecting the hatch arm to the connecting arm with a hinge joint.

16. A method, as claimed in claim 15, wherein the step of changing the moment arm of the force applied from the spring arm, comprises the step of connecting the spring arm to the connecting arm with a hinge joint.

17. A method, as claimed in claim 13, further comprising the step of applying a force from a second spring directly to the hatch.

18. A method for assisting the movement of a hatch, comprising the steps of:
    applying a force from a spring to a spring arm, causing the spring arm to rotate around a spring arm axis of rotation;
    applying a force from the rotating spring arm to a connecting arm, causing the connecting arm to rotate with respect to the spring arm and to translate, wherein the step of applying a force from a spring, comprises the steps of:
    applying a force from a twisted torsion spring, to rotate a rotating anchor; and
    applying a force from the rotating anchor to the spring arm;
    changing the moment arm of the force applied from the spring arm to the connecting arm as the spring arm is rotated, wherein the step of changing the moment arm of the force applied from the spring arm, comprises the step of connecting the spring arm to the connecting arm with a hinge joint;
    applying a force from the rotating and translating connecting arm to a hatch arm to cause the hatch arm to rotate, wherein the step of applying a force from the connecting arm to the hatch arm, comprises the step of connecting the hatch arm to the connecting arm with a hinge joint;
    changing the ratio of the moment arm of the force applied from the spring arm to the connecting arm to the moment arm of the force applied by the connecting arm to the hatch arm, as the spring arm is rotated; and
    applying a force from the hatch arm to the hatch, wherein the step of changing the moment arm of the force applied from the spring arm, comprises the steps of connecting the spring arm to the connecting arm with a pin inserted through a hole in the connecting arm and a first slot in the spring arm wherein the pin can be translated along the slot, and inserting an end of the pin through a second slot in the housing, wherein the end of the pin and the second slot act as a cam and follower.

19. A method, as claimed in claim 18, further comprising the step of applying a force from a second spring directly to the hatch.

* * * * *

UNITED STATES PATENT AND TRADEMARK OFFICE
CERTIFICATE OF CORRECTION

PATENT NO. : 5,396,692
DATED : Mar. 14, 1995
INVENTOR(S) : Kirby H. Floyd et al.

It is certified that error appears in the above-indentified patent and that said Letters Patent is hereby corrected as shown below:

Column 1, line 4, insert the following:

The United States Government has rights in this invention pursuant to Contract No. DAEE07-85-C-R036 awarded by the Department of Defense.

Signed and Sealed this

Twelfth Day of November, 1996

Attest:

BRUCE LEHMAN

Attesting Officer     Commissioner of Patents and Trademarks